(12) United States Patent
Kinder et al.

(10) Patent No.: US 7,401,872 B2
(45) Date of Patent: Jul. 22, 2008

(54) METHOD AND SYSTEM FOR CONTROLLING BRAKE EQUIPMENT WHICH CAN BE ACTIVATED WHEN A MOTOR VEHICLE IS STATIONARY

(75) Inventors: Ralf Kinder, Eitelborn (DE); Gerhard Klapper, Boppard (DE); Reza Shokoufandeh, Green Lane (GB); Franz-Josef Endres, Sessenhausen (DE); Ralf Leiter, Vallendar (DE); Lorenz Maack, Böblingen (DE); Andreas Söns, Grafenau (DE)

(73) Assignee: Lucas Automotive GmbH (DE)

( * ) Notice: Subject to any disclaimer, the term of this patent is extended or adjusted under 35 U.S.C. 154(b) by 0 days.

(21) Appl. No.: 10/464,277

(22) Filed: Jun. 18, 2003

(65) Prior Publication Data
US 2003/0214185 A1 Nov. 20, 2003

Related U.S. Application Data

(63) Continuation of application No. PCT/EP01/14943, filed on Dec. 18, 2001.

(30) Foreign Application Priority Data
Dec. 18, 2000 (DE) .............................. 100 63 063

(51) Int. Cl.
*B60K 28/10* (2006.01)
(52) U.S. Cl. ........................................ 303/191; 180/275

(58) Field of Classification Search .................... 303/3, 303/15, 20, 155, 191, 146, 192; 701/70; 180/275, 282
See application file for complete search history.

(56) References Cited

U.S. PATENT DOCUMENTS

| 4,717,207 A | 1/1988 | Kubota et al. | |
|---|---|---|---|
| 5,129,496 A * | 7/1992 | Sigl et al. | ...................... 192/49 |

(Continued)

FOREIGN PATENT DOCUMENTS

DE 24 20 252 10/1975

(Continued)

*Primary Examiner*—Christopher P Schwartz
(74) *Attorney, Agent, or Firm*—MacMillan, Sobanski & Todd, LLC

(57) ABSTRACT

The present invention provides a method and a system for controlling a braking equipment of a motor vehicle in order to activate the braking equipment at a standstill of the motor vehicle such that braking forces are built up which are necessary to keep the motor vehicle in a state of standstill. To this end it is established on the basis of vehicle movements whether the vehicle is at a standstill. If vehicle movements are detected that cannot occur during driving modes of the motor vehicle, the motor vehicle is in a state of standstill. Subsequently, the braking equipment, and in particular a holding brake mechanism included in the braking equipment, are activated. In order to provide braking forces keeping the motor vehicle at a standstill also when it is on a slope, the braking equipment, and in particular the holding brake mechanism, are controlled in response of the vehicle inclination present in the state of standstill.

17 Claims, 4 Drawing Sheets

U.S. PATENT DOCUMENTS

| | | | |
|---|---|---|---|
| 5,415,467 A | 5/1995 | Utz et al. | |
| 5,984,429 A * | 11/1999 | Nell et al. | 303/113.4 |
| 6,015,194 A * | 1/2000 | Decker | 303/155 |
| 6,053,584 A * | 4/2000 | Schunck et al. | 303/167 |
| 6,056,373 A | 5/2000 | Zechmann et al. | |
| 6,105,705 A * | 8/2000 | Faye | 180/275 |
| 6,246,944 B1 * | 6/2001 | Maruyama | 701/70 |
| 6,260,934 B1 * | 7/2001 | Lee | 303/192 |
| 6,266,599 B1 * | 7/2001 | Van Zanten et al. | 701/71 |
| 6,286,617 B1 * | 9/2001 | DeLuca et al. | 180/275 |
| 6,315,373 B1 * | 11/2001 | Yamada et al. | 303/191 |
| 6,332,654 B1 * | 12/2001 | Yano | 303/89 |
| 6,364,432 B1 * | 4/2002 | Mixon | 303/124 |
| 6,428,120 B1 * | 8/2002 | Holl | 303/191 |
| 6,439,675 B1 * | 8/2002 | Zechmann et al. | 303/191 |

FOREIGN PATENT DOCUMENTS

| | | |
|---|---|---|
| DE | 36 18 532 | 12/1986 |
| EP | 1 031 487 | 8/2000 |

* cited by examiner

METHOD AND SYSTEM FOR CONTROLLING BRAKE EQUIPMENT WHICH CAN BE ACTIVATED WHEN A MOTOR VEHICLE IS STATIONARY

CROSS REFERENCE TO RELATED APPLICATIONS

This application is a continuation of International Application No. PCT/EP01/14943 filed Dec. 18, 2001, the disclosures of which are incorporated herein by reference, and which claimed priority to German Patent Application No. 100 62 063.4 filed Dec. 18, 2000, the disclosures of which are incorporated herein by reference.

The present invention relates to a method and a system for controlling the braking equipment of a motor vehicle which, when the motor vehicle is at a standstill, is adapted to be activated in an automatically controlled manner to build up braking forces in order to keep the motor vehicle in a state of standstill. In particular, the present invention relates to a method and a system in which, based on movements typical of a driving operation of the motor vehicle such as pitching movements, it is detected whether the motor vehicle is at a standstill or not in order to activate the braking equipment at a state of standstill.

BACKGROUND OF THE INVENTION

A motor vehicle in a state of standstill is conventionally prevented from rolling away in that a holding brake is actuated by a vehicle driver either by hand or foot. This activation of the holding brake performed during standstill is an additional measure to be taken by the vehicle driver which is therefore frequently not performed. This may result in a parked motor vehicle rolling away for lack of it having been secured by the holding brake.

In addition, the braking force made available by the holding brake at standstill is directly preset by the vehicle driver. Especially in cases in which the motor vehicle is situated at an ascending or descending slope it is not guaranteed that the braking force of the holding brake generated in this manner is sufficient to keep the motor vehicle in a state of standstill.

It is known from DE-OS-24 20 252 to activate a holding brake of a motor vehicle in response to a position of an accelerator pedal. In this case the holding brake is activated to produce a prefixed braking force when the accelerator pedal is not actuated. It is a drawback in this connection that the braking force generated by the holding brake is prefixed. It can therefore not be suitable to hold the motor vehicle at a standstill at a steep slope, for example. A further drawback is that the holding brake is activated even if the accelerator pedal is not actuated, while the motor vehicle is in an driving mode. This may result in undesired or uncontrollable driving states especially during high vehicle speed, e.g. when a vehicle driver does no longer actuate the accelerator pedal in order to operate the coupling pedal. DE 36 18 532 A1, and corresponding U.S. Pat. No. 4,717,207 both of which are incorporated by reference herein, discloses a system in which by means of a valve arranged between a master brake cylinder and wheel brake cylinders of a braking system brake actuating pressure is maintained which is present as a motor vehicle is stopped. By closing the valve the brake actuating pressure preset by the vehicle driver by way of the brake pedal when stopping the vehicle is maintained. In order to detect that the motor vehicle is at a standstill it is checked whether its speed is zero, whether the clutch is released, whether first gear or reverse gear is engaged and whether the angle of inclination of the motor vehicle corresponds to or is greater than a predetermined angle of inclination. If these conditions are fulfilled, the valve is closed and the vehicle driver can release the brake pedal without the brake actuating pressure preset previously being reduced. Here it is of disadvantage that no braking forces are made available at standstill without the brake pedal being actuated when reaching the state of standstill. This is for example the case if the motor vehicle is brought to a standstill without the brake pedal having been actuated. Moreover, it is not possible with this system to generate braking forces required for a standstill when the ignition of the motor vehicle is switched off:

SUMMARY OF THE INVENTION

An object of the present invention is to provide a method and a system which make it possible to control a braking equipment adapted to be activated at standstill of a motor vehicle in such a manner that the braking forces necessary for the standstill are built up and maintained automatically. Moreover, the braking forces made available in the state of standstill have to be suitable to safeguard that a motor vehicle cannot roll away in different states of standstill.

In order to achieve this object, the invention provides a method for controlling a braking equipment adapted to be activated at a standstill of a motor vehicle. An operating state of a motor vehicle is established in which the motor vehicle is in the state of standstill. If there is such an operating state, a braking equipment of the motor vehicle is controlled in such a manner that it builds up braking forces that hold the motor vehicle at a standstill. In particular, the braking equipment is in this case activated automatically, i.e. this control is effected without the braking equipment having been activated by a vehicle driver by a actuating the braking equipment by way of a brake pedal, for example.

Standstill of the motor vehicle is preferably established in that vehicle movements are detected and compared to vehicle movements which may occur when the motor vehicle is in a driving state. If such driver-typical movements are absent, it is assumed that the motor vehicle is at a standstill.

In addition, build-up of the braking forces necessary for the standstill can be carried out independently of whether during or upon reaching the state of standstill the brake pressure generated by a service braking device comprised by the braking equipment is equal to or higher than a preset reference brake pressure. The brake pressure made available by the service braking device may be preset by the vehicle driver, e.g. by actuating a brake pedal, and/or by a control means for the service braking device, e.g. a braking assistant.

Moreover, build-up of the braking forces necessary for the standstill can in this case be performed only when the brake pressure generated by the service braking device during or upon reaching the state of standstill is present for a predetermined period of time.

Braking forces necessary for the standstill are preferably made available by an accordingly activated holding brake mechanism of the braking equipment.

To avoid that the braking equipment is activated to build up the braking forces necessary for the standstill when the motor vehicle is again to be set into a driving state (immediately) after having reached the state of standstill, build-up of the standstill braking forces can be carried out after a preset period of time after reaching the state of standstill.

It has also to be preferred to build up the braking forces necessary for the standstill in response to the respective state of standstill and/or the respective operating state of the motor vehicle. To this end, the braking equipment, for example, can be controlled such that its braking forces correspond to the braking forces available when reaching the state of standstill, and/or to braking forces which are detected in response to an inclination of the motor vehicle in the state of standstill and/or the vehicle weight. It is moreover possible to generate standstill braking forces that are elevated by a predetermined rate with respect to the braking forces available when reaching the state of standstill. It is also possible to control the braking equipment in response to its generated clamping forces, said clamping forces being adjusted with respect to maximally available braking forces.

If the motor vehicle comprises a service braking device which is not only adapted to be actuated by the vehicle driver but can also be operated in a controlled manner, it is provided to activate such a service braking device as a component of the braking equipment for building up the braking forces necessary for the state of standstill.

It is preferred in this connection to activate the service braking device for a specific period of time. Following a further predetermined period of time after the actuation of the service braking device, the holding brake mechanism can be activated to build up the braking forces necessary for the standstill so as to take over the function of the service braking device. For safety reasons it is of advantage that service braking device and holding brake mechanism are activated simultaneously for a predetermined period of time. In this case, the service braking device is deactivated after a predetermined period of time after the time at which the holding brake mechanism was activated.

The present invention also provides a system for controlling a braking equipment adapted to be activated in the state of standstill of a motor vehicle. It comprises a control unit as well as detection means for detecting parameters characterizing current operating states of the motor vehicle, and interfaces for controlling a braking equipment. In this connection the braking equipment is operated according to one of the methods according to the invention.

In addition, the present invention relates to a computer program with program code parts allowing to perform embodiments of the method of the invention.

Various objects and advantages of this invention will become apparent to those skilled in the art from the following detailed description of the preferred embodiment, when read in light of the accompanying drawings.

BRIEF DESCRIPTION OF THE DRAWING

The accompanying figures are referred to in the following description, in which.

DETAILED DESCRIPTION OF THE INVENTION

In accordance with the provisions of the patent statutes, the principle and mode of operation of this invention have been explained and illustrated in its preferred embodiment. However, it must be understood that this invention may be practiced otherwise than as specifically explained and illustrated without departing from its spirit or scope.

Figure 1:
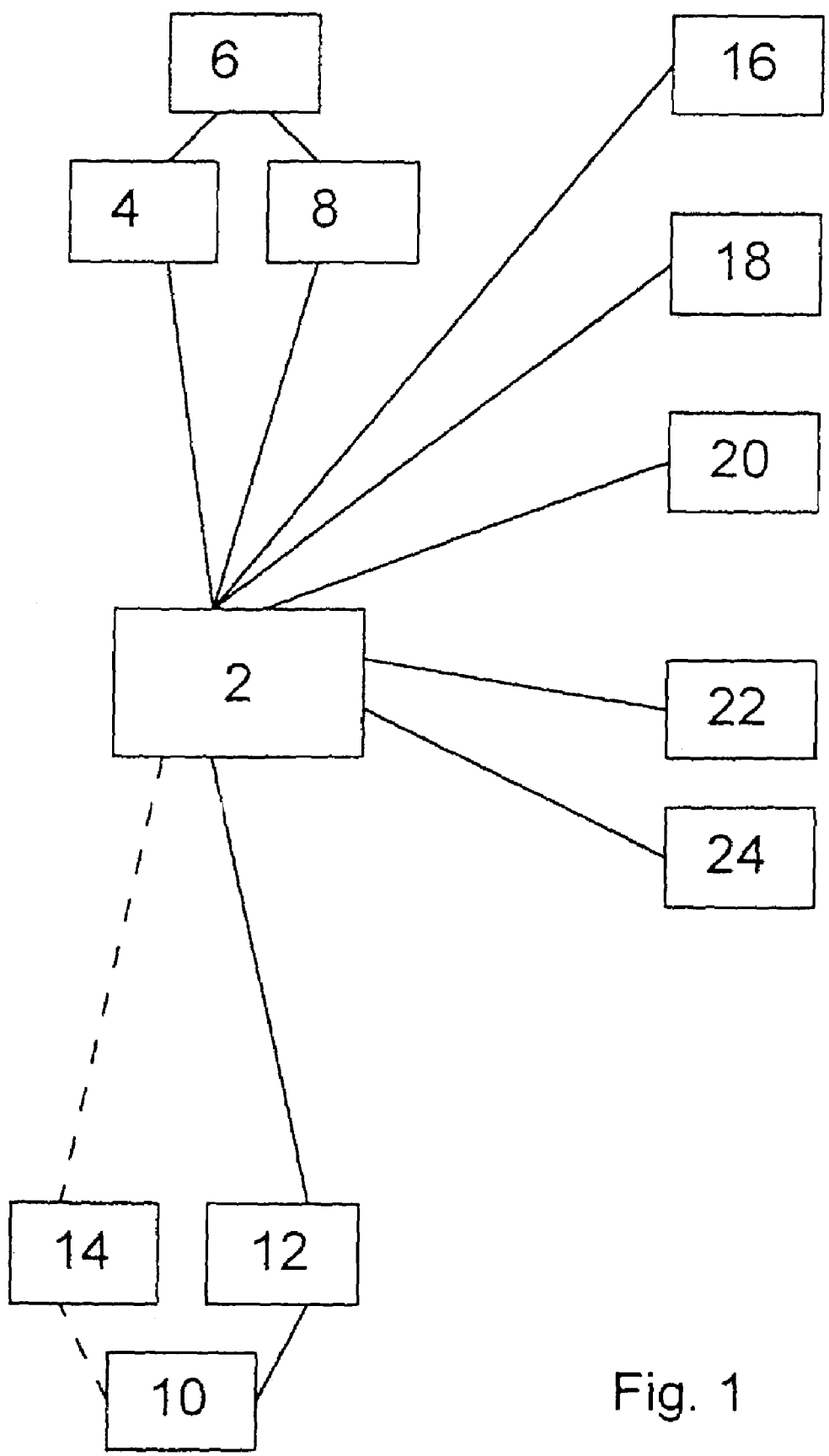
FIG. 1 is a schematic representation of a system according to the invention for controlling a braking equipment adapted to be activated at a state of standstill of a motor vehicle.

The system 1 for controlling a braking equipment adapted to be activated in the state of standstill of a motor vehicle illustrated in FIG. 1 may be a separately constructed equipment of the motor vehicle, utilize, at least partially, already present components of further systems of the motor vehicle, or be comprised by a system making further control functions for the motor vehicle available.

The system 1 comprises a control unit 2 controlling a holding brake mechanism 6 of a motor vehicle (not shown) via an interface 4. The control unit 2 detects parameters characterizing the current operating state of the holding brake mechanism 6 via a sensing device 8.

Operating states of a service braking device 10 are ascertained via a sensing device 12. If the service braking device 10 is controllable, i.e. adapted to be operated in controlled manner alternatively or supplementarily to the actuation by a vehicle driver, the control unit 2 is connected to the control of the service braking device 10 via an interface 14. The function and operation of this optional embodiment of the system 1, indicated in FIG. 1 by dashed lines, is in the following described in greater detail with reference to FIG. 3.

The control unit 2 is also connected to an inclination sensor 16 in order to detect the current inclination or current changes in the inclination of the motor vehicle. It is assumed in this embodiment that the inclination sensor detects inclinations and/or dynamic movements of the motor vehicle about its transverse axis. To simplify matters, inclinations and/or movements of the motor vehicle about its longitudinal axis are not taken into account in the following, though it is alternatively or supplementarily provided to utilize inclinations and/or movements of the motor vehicle about its longitudinal axis during the operation of the system 1.

Data/signals serving for an external control of the control unit 2 are supplied to the control unit 2 via an interface 18. It is provided in this connection that the interface 18 is adapted for the input of In additionrespective control information for the control unit 2 through a vehicle driver (e.g. voice input, touch panel, actuation of switches, keys and the like), comprises mechanically actuable components and/or serves to transmit suitable control signals for the control unit 2 from a (not shown) vehicle control ("engine management system").

In addition, the control unit 2 is connected to a speed sensor 20 for sensing current vehicle speeds, a wheel revolution sensor 22 for sensing numbers of revolutions of individual or several wheels, and an engine speed sensor 24 for sensing current engine speeds.

The control unit 2 receives data made available by further components (not shown) of the motor vehicle via an interface 26, which data furnish further information on the operating state of the vehicle in addition to the above values. Such further information are e.g. values characterizing faultless and/or faulty operating states of a vehicle management system, an anti-locking system (ABS) and of systems for traction and stability control, and those indicating air pressure in individual or several tires, as well as available amounts of fuel.

The operation of the system 1 for controlling a braking equipment of a motor vehicle in which the service braking device 10 is actuable by a vehicle driver but not controllable by control unit 2 is described with reference to the flow chart shown in FIG. 2.

It has to be ascertained whether the motor vehicle is at a standstill in order to control the brake equipment of the vehicle, to be more exact the holding brake mechanism 6, in such a manner that it is activated at a standstill of the motor vehicle and generates braking forces that are necessary in response to the respective state of standstill. To this end it is checked in step 1 whether the ignition of the vehicle is switched on. The switched-on mode of the ignition does in this connection not only mean the operating state of the motor vehicle in which the engine is running, but also operating states in which starting of the engine is possible. The latter case refers to motor vehicles where the engine at standstill and/or in the driving mode is switched off automatically when no engine power is required (e.g. when allowing the vehicle to coast). In this event, a switched-on state of the ignition is involved when the engine can be started again e.g. by operating a gas pedal.

The current vehicle speed is sensed in step 2 to ascertain whether the vehicle moves or stands. If the detected vehicle speed is equal to zero, it is ascertained in step 3 by means of the inclination sensor 16 whether the motor vehicle actually is in the state of standstill.

In general, a motor vehicle performs dynamic movements in the driving mode characteristic of this mode. Accordingly, it can be ascertained whether a motor vehicle is at a standstill or not when movements of the vehicle correspond to movements typical of the driving mode.

Current inclinations of the motor vehicle, to be more exact changes in the inclination about its transverse axis (according to the embodiment of FIG. 1), are detected by the inclination sensor 18. In case the sensed vehicle movements are within a range in which movements typical of the vehicle being driven may be, it has to be assumed that the vehicle is not at a standstill. In contrast, it can be ascertain that the motor vehicle is at a standstill if the sensed vehicle movements are not within the range of the movements typical of the driving mode.

If in step 3 the absence of vehicle movements typical of driving ("pitching movements") are sensed, it is checked in step 4 by using the sensing device 12 whether the brake pressure generated by the service braking device (10) (by actuation through a vehicle driver) is higher than a preset reference brake pressure $pB_{ref}$. In order to prevent that the holding brake mechanism 6 is activated if the motor vehicle is again to be transferred to a driving mode after having reached the state of standstill, it is provided to check whether the brake pressure of the service braking device 10 is above the preset brake pressure $pB_{ref}$ (e.g. 5 bar) for a predetermined period of time (e.g. 1-2 seconds).

After that, the holding brake mechanism 6 is activated via interface 4 in step 5, with an activation retardation for a preset period of time (e.g. 1-2 seconds) being of advantage. The adjustment of the brake pressure that is generated by the holding brake mechanism 6 and suitable to keep the vehicle at a standstill, can be performed in different ways. The holding brake mechanism 6 can be controlled in such a manner that it generates a preset brake pressure (e.g. 5 bar) upon each activation of this type, which is elevated with respect to the brake pressure previously generated by the service brake device 10 by a preset value (e.g. 5 bar), or a brake pressure which is fixed in response to the vehicle inclination sensed by the inclination sensor 16 during standstill. When setting the holding brake mechanism also the clamping force generated by it can be used as reference value, which clamping force is to make up more than two thirds of the maximally possible clamping force, e.g. dependent on the type of vehicle in which the system 1 is used.

To guarantee that the braking force necessary at standstill is supplied with the system 1 or further control means of the vehicle connected thereto malfunctioning, the control unit 2 should in such cases control the holding brake mechanism 6 at standstill in such a manner that it generates the maximally possible braking force. Since the motor vehicle is then at a standstill, this procedure does not cause damage or wear of the wheel brakes. In view of the fact that the holding brake mechanism 6 has to be released when the motor vehicle is to be brought from standstill into a driving mode, it has to be preferred that the generation of the maximally possible braking force by the holding brake mechanism 6 at standstill is limited to such, not normal, operating states. Consequently, during normal operation of the system 1, the braking force generated at standstill can quickly be reduced during a transition to a driving operation.

Figure 3:
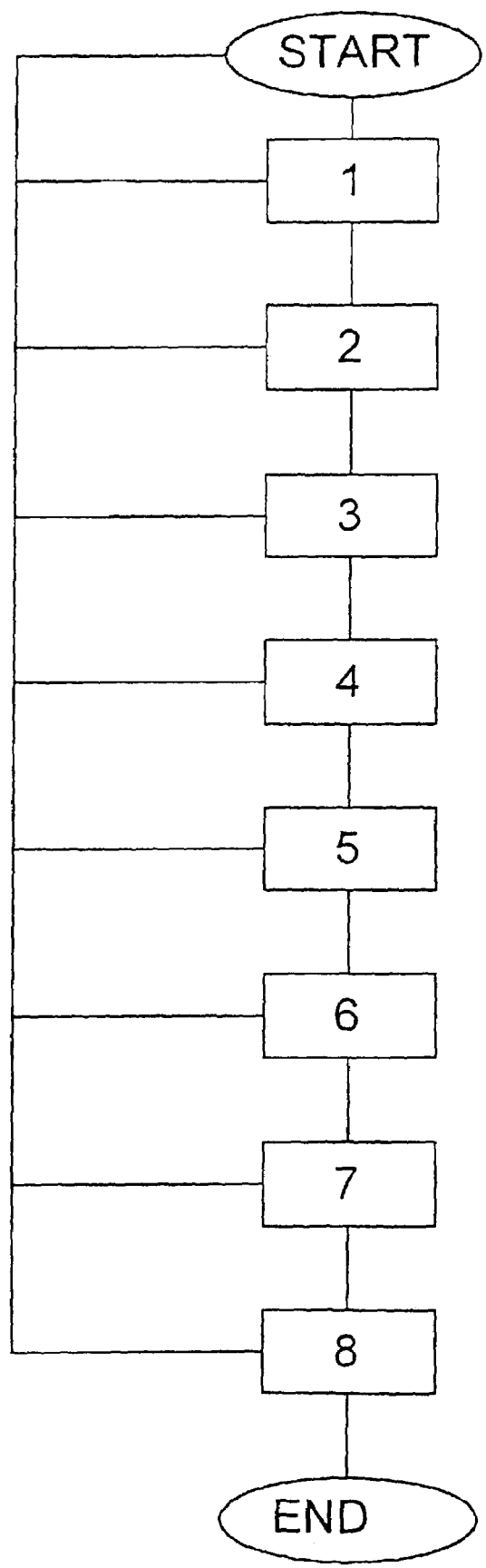
FIG. 3 is a flow chart of a further embodiment of a method according to the invention for activating a controllable braking equipment.

With reference to the flow chart illustrated in FIG. 3, the operation of the system 1 is described for that embodiment in which the service braking device 10 can be controlled by the control unit 2.

Figure 2:
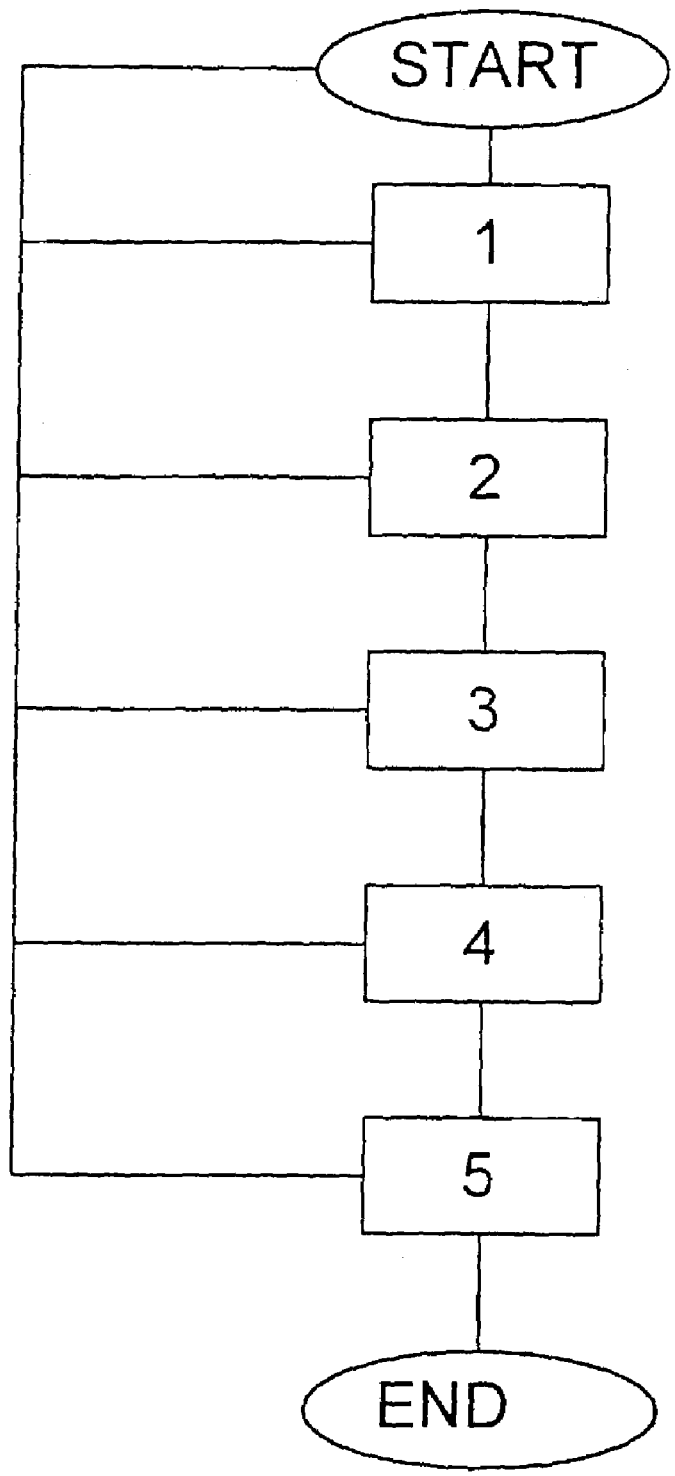
FIG. 2 is a flow chart of an embodiment of a method according to the invention for activating a controllable braking equipment.

Steps 1, 2 and 3 which correspond to steps 1, 2 and 3 of FIG. 2 are carried out to ascertain whether the motor vehicle is at a standstill.

Step 4, corresponding to step 4 explained above, is provided optionally in this procedure. This is indicated by the dashed lines in FIG. 3.

If the motor vehicle is at a standstill, according to step 5 the service braking device 10 is activated by the control unit 2; this activation can take place immediately upon reaching the state of standstill or after a preset period of time (e.g. 1-2 seconds). The brake pressure to be generated by the service braking device 10 in this state can, if the optional step 4 was performed, be established in response to the brake pressure and/or the current inclination of the motor vehicle that was built up previously by an actuation of the service braking device 10 by a vehicle driver, or adjusted to a preset value.

It has to be taken into account in this connection that an energy supply is provided for operating the service braking device 10 when the ignition is switched off in this operating state of the motor vehicle.

After the expiry of a preset time interval (e.g. 30 seconds and more), the holding brake mechanism 6 is activated in step 6, wherein its braking forces, as explained above with reference to step 5 of FIG. 2, are established or adjusted in preset manner.

The service braking device 10 is subsequently deactivated in step 7 because its braking forces are no longer necessary to maintain the state of standstill. In doing so, the service braking device 10 is controlled in such a manner that its generated braking forces are slowly reduced preferably after a preset period of time (e.g. 1-2 seconds).

In order to determine the clamping forces caused by the holding brake mechanism 6, it is provided to carry out the optional step 8 by deactivating the holding brake mechanism for a short period of time. During the short deactivation, which may have a duration of e.g. 60 milliseconds, the clamping forces generated by the holding brake mechanism 6 are then detected by means of suitable detection means (e.g. sensor 8).

In the modes of operation explained with reference to FIGS. 2 and 3 it is possible to omit steps 1 and 2 if the standstill detection carried out in steps 3 guarantees on the basis of vehicle inclinations (changes) that a standstill of the vehicle is ascertained with certainty. In addition, when establishing the braking forces and/or clamping forces to be generated by the holding brake mechanism 6 and/or the service braking device 10, further parameters can be used in addition to the current motor vehicle inclination, such as the vehicle weight, the surface structure of the respective road and the external temperature.

Figure 4:
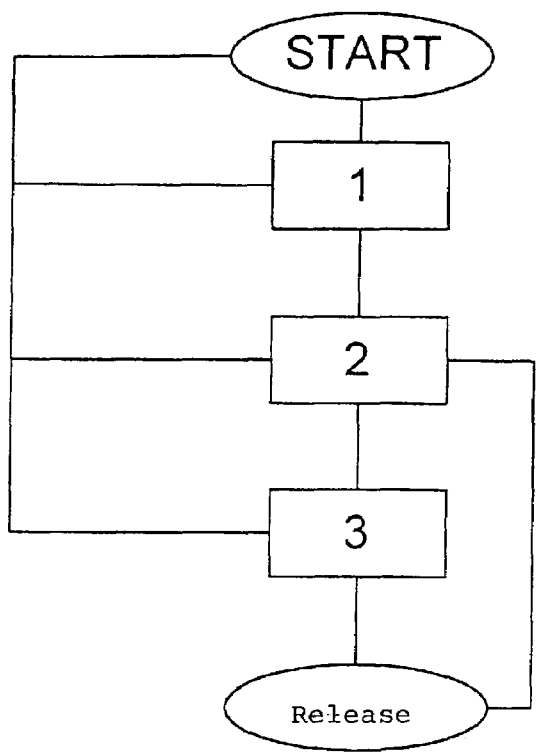
FIG. 4 is a flow chart of an embodiment of a method according to the invention for deactivating a controlling braking equipment.

If the motor vehicle is to be brought from standstill to a driving state, the system 1 is operated in accordance with the mode illustrated in FIG. 4 by a flow chart.

If it is ascertained in step 1 that the holding brake mechanism 6 is activated to keep the motor vehicle at a standstill, it is checked in step 2 whether the motor vehicle is to be transferred from the standstill to a driving mode. If so, the holding brake mechanism 6 is deactivated in order to allow the desired driving mode.

If no desired transfer to a driving mode is detected, it is checked in step 3 whether there are control signals for the control unit supplied via the interface 18. Such control signals may be generated e.g. by a vehicle driver actuating a switch or key or by a control system of the motor vehicle. In case a control signal is detected which indicates that the holding brake mechanism 6 has to be released, the holding brake mechanism 6 is deactivated by controlling the control unit 2 in order to reduce the brake pressure generated during standstill. On the contrary, the holding brake mechanism 6 remains activated if neither a transfer to a driving operation is to take place nor a control signal suitable to release the holding brake mechanism 6 is received. It is provided in this connection to carry out step 2 or 3 also in reverse order.

Figure 5:
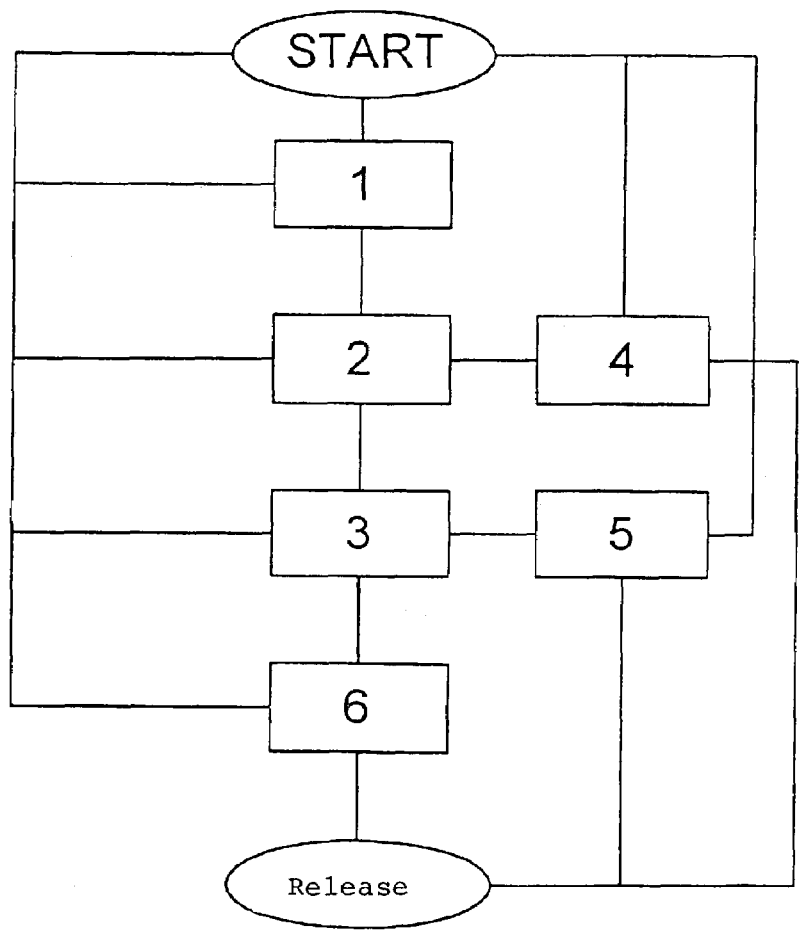
FIG. 5 is a flow chart of an embodiment of a method according to the invention for reactivating a controllable braking equipment.

For safety reasons is the system 1 also operated in the mode outlined in FIG. 5 in order to reactivate the holding brake mechanism 6 when necessary. If it is ascertained in step 1 that the holding brake mechanism 6 is activated, a starting recognition is performed in step 2 corresponding to the above explained steps 2 of FIG. 4. If it is detected that the motor vehicle is to be moved from the state of standstill, the number of rotations of one or several wheels is sensed by means of the wheel rotation sensors 22 in step 4. If no wheel movements are detected, the holding brake mechanism 6 is again activated in order to secure the motor vehicle. On the contrary, the holding brake mechanism 6 is deactivated in case wheel rotations are detected here.

If in step 3 corresponding to step 3 of FIG. 4 a control signal for releasing the holding brake mechanism 6 is detected, it is checked in step 5 whether the motor vehicle moves in an undesired manner. This is the case, for example, if the ignition is not switched on, and/or the vehicle engine is not running, and/or engine speed and/or engine torques are present which are not sufficient to move the vehicle from the standstill if it is ascertained at the same time that the vehicle wheels are rotating. Accordingly, the holding brake mechanism 6 is reactivated to generate the braking forces necessary for the standstill.

Moreover, it is checked in step 6 whether further conditions are fulfilled which require a renewed activation of the holding brake mechanism 6. Such conditions are e.g. actuations of the service braking device 10 by a vehicle driver, movements of the motor vehicle typical of standstill or stopping (pitching movements), and the like.

Comparable to FIG. 4, steps 2, 3 and 4 of FIG. 5 may also be carried out in different order.

The invention is:

1. A method for controlling braking equipment of a motor vehicle when the motor vehicle transitions from a driving mode to a standstill mode wherein an ignition of the motor vehicle is switched off, the braking equipment including a service brake device actuatable by a driver and a holding brake mechanism separate from the service brake device for generating braking forces to maintain the motor vehicle in a state of standstill when in the standstill mode wherein the ignition of the motor vehicle is switched off, comprising the following steps:

a) determining that the motor vehicle is in a standstill mode wherein an ignition of the motor vehicle is switched off by detecting vehicle movements that are not typical of a driving mode and that an ignition of the motor vehicle is switched off;
   b) determining an inclination of the motor vehicle when the motor vehicle enters the standstill mode wherein an ignition of the motor vehicle is switched off; and
   c) subsequent to step a), automatically activating the holding braking mechanism in the standstill mode wherein an ignition of the motor vehicle is switched off determined in step a), to built up braking force based at least in part on the inclination determined in step b).

2. The method of claim 1 further comprising, before step c), the step of:
   e) determining an ending brake pressure generated by the service brake device at the end of the driving mode; and
   wherein the activating in step c) is based at least in part on the ending brake pressure determined in step e).

3. The method of claim 2 wherein the activating in step c) is based at least in part upon the ending brake pressure determined in step e) being present for a predetermined period of time.

4. The method of claim 2 wherein the activating in step c) occurs while the ending brake pressure determined in step e) is still present.

5. The method of claim 1 further comprising, before step c), the step of:
   d) determining that an ignition state of the vehicle is in an off mode,
   wherein the activating in step c) is based at least in part upon the ignition state determined in step d).

6. The method of claim 5 wherein the determining in step d) includes determining an operating state of the motor vehicle in which an engine of the motor vehicle is both not running and not in a mode for automatic restart.

7. The method of claim 1 wherein the vehicle movements detected in step a) are movements about a transverse axis of the motor vehicle.

8. The method of claim 1 wherein the vehicle movements detected in step a) are movements about a longitudinal axis of the motor vehicle.

9. The method of claim 1 wherein the activating in step c) occurs in a predetermined amount of time after the determining in step a).

10. A method for controlling braking equipment of a motor vehicle when the motor vehicle transitions from a driving mode to a standstill mode wherein an ignition of the motor vehicle is switched off, the braking equipment including a service brake device actuatable by a driver and a holding brake mechanism separate from the service brake for generating braking forces to maintain the motor vehicle in a state of standstill when in the standstill mode wherein an ignition of the motor vehicle is switched off, comprising the following steps:

a) determining that an ignition state of the vehicle is an off state;
   b) determining that the motor vehicle is in a standstill mode wherein an ignition of the motor vehicle is switched off by detecting vehicle movements that are not typical of a driving mode;
   c) determining an inclination of the motor vehicle when the motor vehicle enters the standstill mode wherein an ignition of the motor vehicle is switched off;
   d) automatically activating the holding braking mechanism in the standstill mode wherein an ignition of the motor vehicle is switched off based at least in part on the ignition state determined in step a) and the inclination determined in step c).

11. The method of claim 10 further comprising, before step d), the step of:
   e) determining an ending brake pressure generated by the service brake device at the end of the driving mode; and
   wherein the activating in step d) is based at least in part on the ending brake pressure determined in step e).

12. The method of claim 11 wherein the activating in step d) is based at least in part upon the ending brake pressure determined in step e) being present for a predetermined period of time.

13. The method of claim 11 wherein the activating in step d) occurs while the ending brake pressure determined in step e) is still present.

14. The method of claim 10 wherein the vehicle movements detected in step b) are movements about a transverse axis of the motor vehicle.

15. The method of claim 10 wherein the vehicle movements detected in step b) are movements about a longitudinal axis of the motor vehicle.

16. The method of claim 10 wherein the activating in step d) occurs in a predetermined amount of time after the determining in step b).

17. The method of claim 10 wherein the determining in step a) includes determining an operating state of the motor vehicle in which an engine of the motor vehicle is both not running and not in a mode for automatic restart.

* * * * *